United States Patent [19]

Madonian et al.

[11] 3,914,676

[45] Oct. 21, 1975

[54] POSITION CONTROLLER

[75] Inventors: Vahe Samuel Madonian, Simi; Joseph Daniel Douglas, La Puente, both of Calif.

[73] Assignee: International Telephone and Telegraph Corporation, New York, N.Y.

[22] Filed: Apr. 22, 1974

[21] Appl. No.: 462,759

[52] U.S. Cl. ................. 318/467; 318/372; 200/47; 318/673; 251/134
[51] Int. Cl.² ......................................... G05B 11/14
[58] Field of Search ........... 318/466, 467, 468, 382, 318/372, 672, 673; 251/134, 133, 136; 200/47

[56] References Cited
UNITED STATES PATENTS
3,378,742  4/1968  Telkamp ............................ 318/673
3,614,574  10/1971  Hodges ............................ 318/673 X OTHER PUBLICATIONS
A.P.C. Appication of Steinbach, Ser. No. 347,517, published May 18, 1943.

*Primary Examiner*—B. Dobeck
*Attorney, Agent, or Firm*—A. Donald Stolzy

[57] ABSTRACT

A system for controlling the position of a four-position rotary valve from a remote location, for example, in an airplane. A manually operable, single-pole, multi-throw switch supplies a voltage to a selected one of a plurality of normally closed limit switches via a selected one of a corresponding plurality of contacts of the manually operable switch with which the pole thereof is engageable. A motor then drives a cam and the valve until the cam opens the said one limit switch. The valve is then located in a position corresponding to the said selected contact. A relay is employed to energize the motor. An electromagnetic motor brake is energized at the same time the motor is energized. When the brake is energized, the motor output shaft is free to rotate. When the brake is deenergized, the motor output shaft is locked.

2 Claims, 8 Drawing Figures

U.S. Patent   Oct. 21, 1975   Sheet 1 of 2   3,914,676
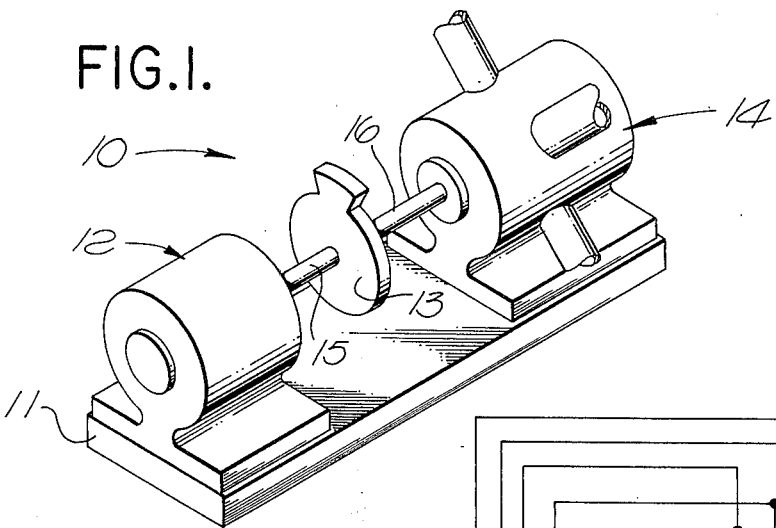
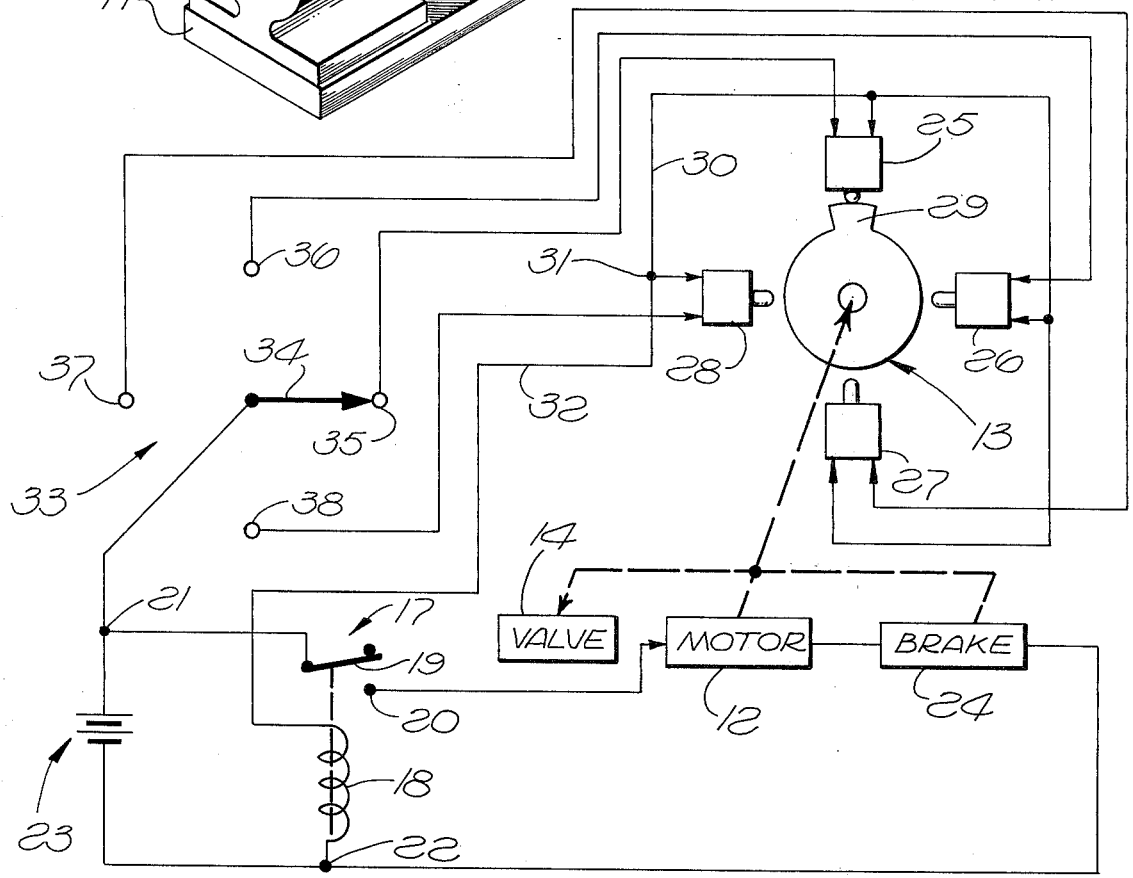
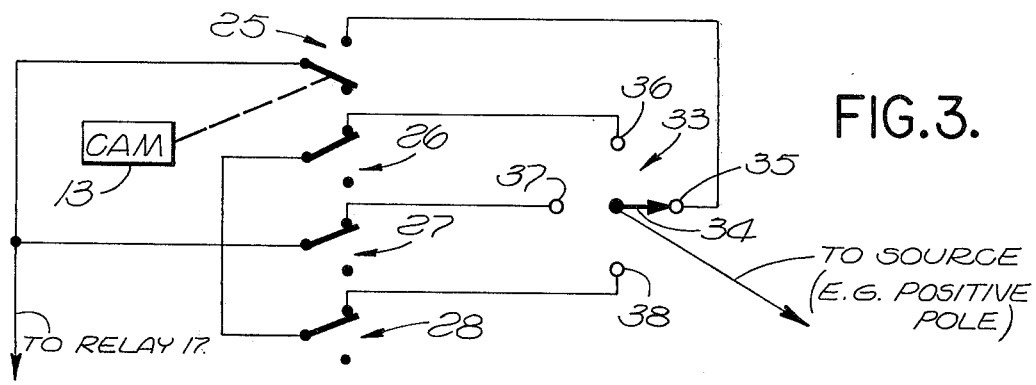

POSITION CONTROLLER

BACKGROUND OF THE INVENTION

This invention relates to systems for controlling devices from remote locations or the like, and more particularly, to position selection apparatus.

The present invention may be employed to control many devices including, but not limited to, rotary aircraft valves for transferring fuel between wing tanks or otherwise.

In the past, muliposition valves were controlled by solenoids and/or springs. In many cases, such valves are not safe in aircraft because of the loads imposed thereon by erratic aircraft movements.

SUMMARY OF THE INVENTION

In accordance with the present invention, the above-described and other disadvantages of the prior art are overcome by providing plural limit switches connected from respective contacts of a manually operable, single-pole, multiple-throw switch. A motor moving a cam and a controlled device, e.g. a rotary valve, causes the cam to open a limit switch corresponding to the contact which the switch pole is manually set to engage. The valve is, thus, positioned in accordance with the contact so selected.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of an electric motor, cam and valve assembly constructed in accordance with the present invention;

FIG. 2 is a diagrammatic view of one embodiment of the present invention;

FIG. 3 is a schematic diagram of a portion of the embodiment illustrated in FIG. 2;

DESCRIPTION OF THE PREFERRED EMBODIMENT

Figure 4:
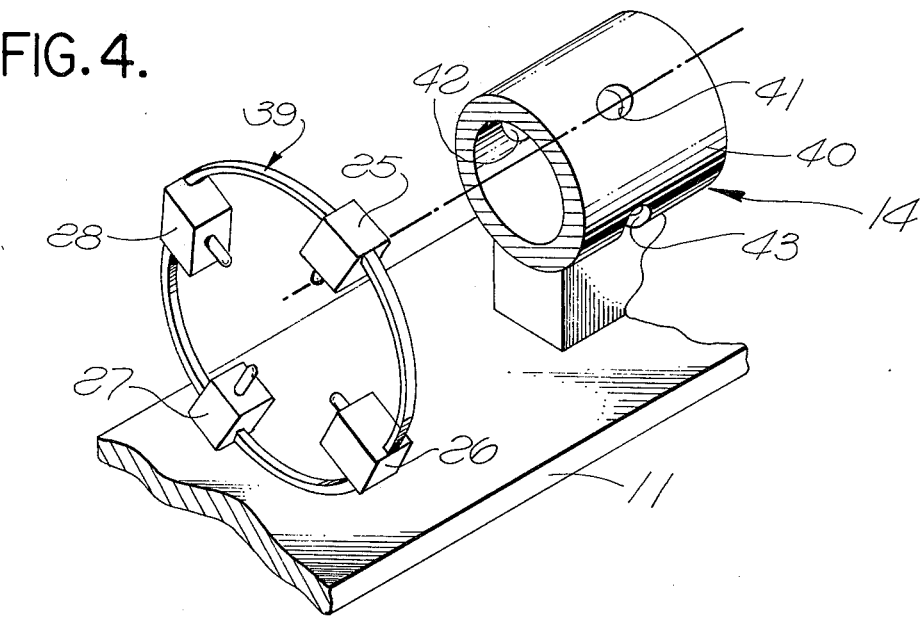
FIG. 4 is a perspective view of a limit switch assembly and valve cylinder.

In the drawings, in FIG. 1, an assembly 10 is shown including a rectangular base 11, an electric motor 12, a cam 13 and a rotary valve 14.

Motor 12 and valve 14 are fixed to base 11. Motor 12 has an output shaft 15 which is fixed both to cam 13 and to an input shaft 16 of valve 14.

As shown in FIG. 2, motor 12 drives both cam 13 and valve 14.

A relay is provided at 17 including a winding 18, a pole 19 and a contact 20.

Junctions are provided at 21 and 22. A source of potential 23 is connected between junctions 21 and 22.

The lower end of relay winding 18, as viewed in FIG. 2, is connected to junction 22.

Motor 12 and an electromagnetic brake 24 are connected in series from relay contact 20 to junction 22. Relay pole 19 is connected from junction 21.

In accordance with the foregoing, motor 12 and brake 24 are connected in series. However, this need not be the case. In any event, valve 14, motor 12 and brake 24 each, by itself, may be conventional. Brake 24 is of the type which, when energized, releases the output shaft 15 of motor 12 and allows motor 12 to drive both cam 13 and valve 14. When deenergized, brake 24 locks shaft 15 so that it cannot move or rotate with respect to base 11.

As will be explained, valve 14 has four "operative" positions. For this reason, four limit switches 25, 26 27 and 28 are located at 90 degree intervals around cam 13.

Cam 13 has a projection 29. All of the limit switches 25–28 are normally closed unless cam projection 29 is disposed immediately adjacent thereto. In the latter case, the limit switch is open.

All of the switches have one contact connected to a common lead 30. Limit switch 28 is connected to lead 30 at a junction 31. The upper end of relay winding 18, as viewed in FIG. 2, is connected to the common lead or common 30 at junction 31, the connection between relay winding 18 and junction 31 being illustrated at 32.

A manually operable, single-pole, multi-throw switch is illustrated at 33 having a pole 34 and contacts, 35, 36, 37 and 38 connected respectively to the other contacts of limit switches 25–28. Pole 34 is connected from junction 21.

OPERATION

In the operation of the embodiment of FIG. 2, normally, indicia will be provided adjacent each of the contacts 35–38. Pole 34 is then placed in engagement with that contact corresponding to which of the four positions of valve 14 is selected. For example, assume that pole 34 is placed in engagement with contact 35, and cam projection 29 is located in a position spaced, for example, more than 90 degrees from the position in which it is shown in FIG. 2. In this case, limit switch 25 will, therefore, be closed, and the circuit and energizing relay winding 18 will be complete. The lower end of winding 18 is already connected to the negative pole of source 23 through junction 22. The upper end of winding 18 is connected to the positive pole of source 23 through junction 21 via lead 32 connected from the upper end of winding 18, through junction 31, lead 30, switch 25, contact 35 and pole 34, pole 34 being connected to junction 21.

The foregoing sequence of events then causes relay winding 18 to be energized, and relay pole 19 to engage relay contact 20 to supply electric power to motor 12 and brake 24 which are connected in series from relay contact 20 to junction 22. Junction 22 is maintained at the potential of the negative side of source 23. Relay contact 20, through relay pole 19 to junction 21, is maintained at the potential of the positive end of source 23. Motor 12 and brake 24 are, thus, energized. Motor 12 then turns cam 13 and valve 14 until projection 29 opens limit switch 25. In this case, the circuit is broken from junction 21 to the upper side of relay winding 18, the motor 12 stops and brake 24 locks shaft 15. Cam 13 is, thus, locked in the position shown in FIG. 2. This places valve 14 in the position selected by causing pole 34 of switch 33 to engage contact 35.

Each "operative" position of the valve 14 corresponds to the location of a particular one of the limit switches 25–28.

In FIG. 2, each of the limit switches 25–28 may be, in themselves, entirely conventional.

As a practical matter, many or most limit switches have spring biased contacts which are opened or closed by the movement of a cam or other structure. Thus, each of the limits switches 25–28 may be spring biased closed unless opened by the cam projection 29. As shown in FIG. 3, limit switches 26–28 are, thus, spring biased to the positions shown in FIG. 3.

As shown in FIG. 4, an assembly 39 is fixed to base 11 supporting limit switches 25–28.

Valve 14 may have an internal or external rotor. However, only a fixed sleeve portion 40 is shown in FIG. 4 having an inlet port 41 and outlet ports 42 and 43.

Figure 5:
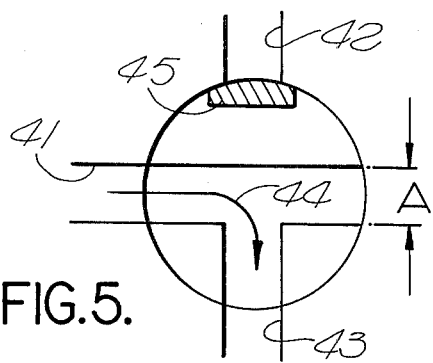
FIGS. 5, 6, 7 and 8 are diagrammatic views of the valve of FIGS. 1, 2 and 4 shown in four positions thereof.

As shown in FIG. 5, the bottom wall of sleeve 40 is not provided with a port but is solid at A. Flow then takes place in the direction of an arrow 44, outlet port 42 being shut off by the rotor 45.

Figure 6:
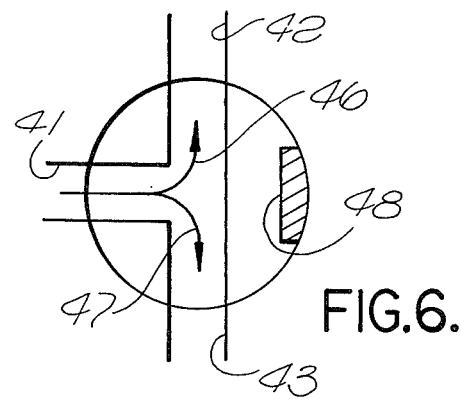
Figure 7:
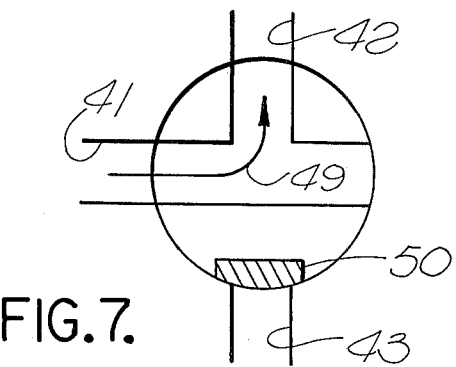

In FIG. 6, flow is in the direction of both arrows 46 and 47. The valve rotor 48 does not close any port because there is no port to close at the location thereof, as shown in FIG. 6. In FIG. 7, flow is in the direction of an arrow 49, port 43 being closed by the rotor in the location 50.

Figure 8:
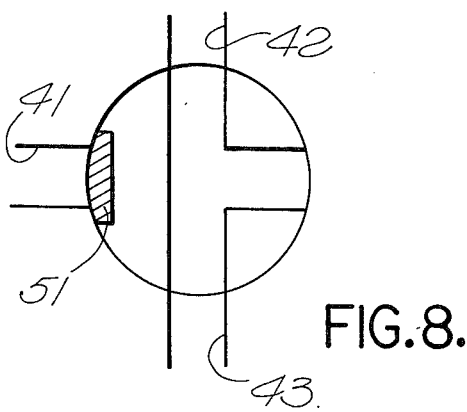

In FIG. 8, the valve position may be described in the "off" position. This is true because the rotor in the position 51 closes the inlet port 41 although ports 42 and 43 are in communication with each other.

What is claimed is:

1. A position selection system comprising: a base; a rotary valve fixed relative to said base; a motor fixed relative to said base, said motor having an output shaft which is rotated when said motor is energized, said valve having an input shaft fixed relative to said motor output shaft for movement therewith; an electrically operable brake energizable to unlock said motor output shaft and deenergizable to lock said motor output shaft; a cam fixed relative to said motor output shaft; a plurality of normally closed limit switches fixed relative to said base in positions relative to said cam to be opened one at a time by movement of said cam with said motor output shaft; a common lead, a first side of each limit switch being connected to said common; a manually movable, single-pole, multiple-throw switch having a pole and a plurality of contacts for engagement, one at a time, by said switch pole, said plurality of contacts being connected to respective second sides of said limit switches; and actuation means connected from said switch pole and said common for energizing both said motor and said electrically operable brake in a manner to cause said motor output shaft and said cam to turn continuously until said cam opens one of said limit switches, which one is connected from a corresponding one of said contacts engaged by said switch pole, said one limit switch, when open, breaking the circuit between said pole and said common via said one contact and said one switch, said valve having ports movable to positions in and out of communication with each other, said ports being rotatable with the input shaft to said valve to a plurality of positions in which any fluid flow through said valve is different, said cam and said limit switches being located in a manner such that only one of said limit switches are opened to stop rotation of said motor output shaft when said valve input shaft rotates to one of said plurality of valve positions corresponding to the said one contact, said manually operable switch being remote from said base, said valve, said motor, said brake, said cam and said actuation means, said manually operable switch remotely controlling said valve position.

2. The invention as defined in claim 1, wherein a source of potential and a relay are provided, said relay having a winding with first and second ends, and a pole and a contact, said relay contact being engageable by said relay pole, first and second junctions, said switch pole being connected to said first junction, said source being connected between said first and second junctions, said first winding end being connected to said second junction, said second winding end being connected to said common, said relay pole being connected from said first junction, first and second leads connected from said relay contact and said second junction, respectively, to said motor and to said brake to supply electric power thereto when said winding is energized.

* * * * *